Patented Jan. 9, 1945

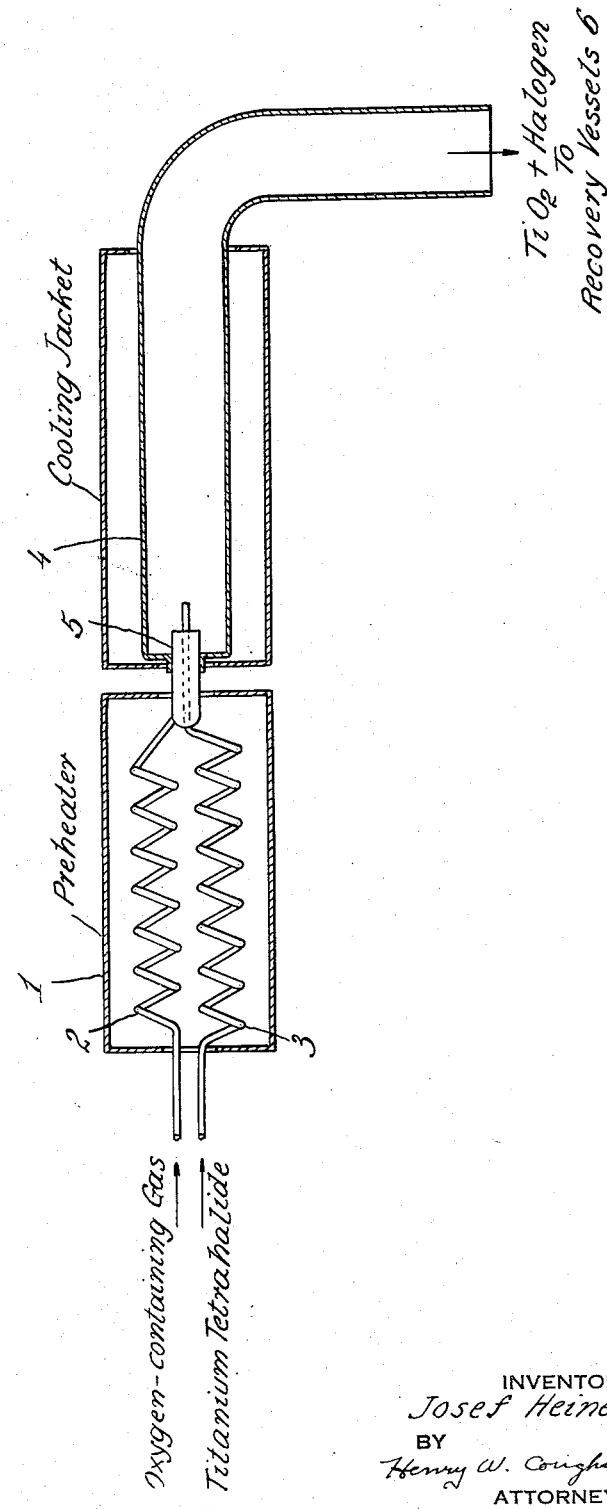

2,367,118

UNITED STATES PATENT OFFICE 2,367,118

MANUFACTURE OF TITANIUM DIOXIDE

Josef Heinen, Cologne-on-the-Rhine, Germany; vested in the Alien Property Custodian Application July 29, 1941, Serial No. 404,503
In Germany June 7, 1940

3 Claims. (Cl. 23—202)

The present invention relates to the preparation of titanium dioxide by rapid oxidation of a titanium halide. More particularly it relates to the preparation of titanium dioxide through combustion of titanium chloride.

It is known that when titanium halides, that is to say, binary compounds of titanium and a halogen, are caused to react with gases containing free oxygen, at temperatures above 1000° C., titanium dioxide and the halogen, for instance, chlorine, are obtained. However, crystallization effects often occur in the course of this reaction and these effects are particularly disturbing when it is desired to obtain titanium dioxide of pigmentary quality.

According to a known method, undesirable excessive crystallization of the titanium dioxide resulting from the reaction between a titanium halide and oxygen may be avoided by causing the gaseous mixture of the titanium halide and the oxygen containing gas to flow as quickly as possible through a heated reaction chamber. In addition, according to this method, care should be taken that the gaseous mixture reaches reaction temperature as quickly as possible.

The principal object of the present invention is to provide a simple and effective method and apparatus for preparing pigmentary titanium dioxide by reacting a titanium halide with oxygen at elevated temperature while avoiding the development of undesirable crystallization of the titanium dioxide particles.

I have found that it is possible to obtain valuable titanium dioxide pigments and to prevent the pigment particles from becoming excessively large by causing the halide and oxygen to react within a reaction vessel in a reaction space as small as possible and by maintaining between the reaction space and the wall of said vessel, a difference of temperature such that the temperature within the reaction vessel adjacent to said wall is lower than the reaction temperature of the halide with the oxygen.

Therefore, according to the present invention, the two gases which are to react with each other as above stated are separately heated to a temperature higher than the temperature of reaction and then, in order to react, brought into contact with each other, by passing through a tube of suitable construction.

The reaction vessel is mounted, for instance, in a chamber maintained from the outside at a temperature below that to which the gases are initially heated. The reaction which takes place, assuming that the halide is titanium tetrachloride, proceeds according to the following equation:

$$TiCl_3 + O_2 = TiO_2 + 2Cl_2$$

and is slightly exothermic. Therefore, after reaction, which is in the nature of an ignition, has started, the combustion continues, even if the temperature of the wall of the reaction chamber is lower than the reaction temperature. The heat liberated by the reaction prevents excessive cooling.

Because of this arrangement, the formation of the titanium dioxide takes place in the central portion of the reaction vessel at the point where the reaction gases are mixed with each other. The particles of titanium dioxide thus formed which may reach the colder wall of the reaction chamber cannot, in this case, condense to relatively large crystalline agglomerates. Hence, injurious crystallization effects are avoided. When using a suitable ratio of the amounts of respective gases which are mixed together in the reaction vessel, I obtain a hundred per cent reaction within the small space wherein the gases are mixed together, generally with the formation of a yellow-green flame. When the gas with which the titanium halide is to react is pure oxygen, a hundred per cent reaction is very easily obtained, producing a bright light, using a proportion of tetrahalogenide to oxygen of 1 to 4. Of course, analogous results may be obtained with different proportions. According to the proportions of the reactants employed, various results may be obtained, for instance, a hundred per cent reaction without formation of flame. Instead of employing pure oxygen, I may also employ air or any other gaseous mixture containing oxygen.

Other features of the present invention will be apparent from the following detailed description of a preferred embodiment thereof which will be hereinafter described with reference to the accompanying drawing, which is supplied for illustrative purposes only but not limitative purposes.

The single figure of the drawing is a diagrammatical view of an apparatus for carrying out the method according to the invention.

Reference numeral 1 is a preheater for the reactants, for instance, an oven, heated to a temperature of 1000–1100° C., preferably by means of electricity. Oxygen is fed through the quartz coiled tube 2, and is heated in its passage therethrough. A similar coiled tube 3 serves for the introduction and heating of titanium tetrachloride. Thus, the two reactants are heated separately to the necessary reaction temperature. At the inlet of the chamber 4, at the point where the reaction is to take place, there is provided a tube 5, for mixing the gases and producing the combustion thereof. The chamber 4 is kept at a temperature of 750° C., for example, by means of a cooling jacket as shown in the drawing. The amount of titanium tetrachloride fed for the reaction is, through regulation of the preheating, such that the proportion of halide with respect to the amount of oxygen is 1 to 4. During the reaction, a yellow-green flame burns from the outlet of tube 5, and a pigment smoke issues from the chamber 4, which smoke is separated from the chlorine by depositing the titanium dioxide in vessels 6, not shown, connected to the chamber 4.

The pigment that is obtained is very voluminous and has a coloring power, i. e., tinting strength and hiding power, which corresponds to that of the best titanium dioxide pigments. The particle size is very uniform and it is pure white.

In a general manner, while I have, in the above description, disclosed what I deem to be a practical and efficient embodiment of the present invention, it should be well understood that I do not wish to be limited thereto as there might be changes made therein without departing from the principle of the present invention as comprehended within the scope of the appended claims.

I claim:

1. In the manufacture of titanium dioxide by the rapid oxidation of a titanium tetrahalide at high temperatures within a reaction chamber, a method for preventing growth of excessively large crystals on the walls of the reaction chamber which comprises separately heating a titanium tetrahalide and a free oxygen-containing gas outside of the reaction chamber to temperatures above the reaction temperature of the tetrahalide with oxygen, contacting and mixing the heated gases in a reaction chamber having cooled walls and conducting the reaction between the heated gases within a small space extending from their point of contact and mixing in the chamber, and maintaining the walls of said chamber at temperatures sufficiently below the reaction temperature to prevent growth of excessively large crystals thereon.

2. The process as defined in claim 1, in which the tetrahalide is titanium tetrachloride.

3. The process defined in claim 1, in which the tetrahalide is titanium tetrachloride and the free oxygen-containing gas is oxygen.

JOSEF HEINEN.